US009041735B2

(12) United States Patent
Choi et al.

(10) Patent No.: US 9,041,735 B2
(45) Date of Patent: May 26, 2015

(54) IMAGE DISPLAY DEVICE AND METHOD OF MANAGING CONTENT USING THE SAME

(75) Inventors: Woosik Choi, Seoul (KR); Dami Choe, Seoul (KR); Jeonghwa Yang, Seoul (KR); Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 13/222,760

(22) Filed: Aug. 31, 2011

(65) Prior Publication Data

US 2012/0262494 A1 Oct. 18, 2012

(30) Foreign Application Priority Data

Apr. 13, 2011 (KR) ........................ 10-2011-0034152

(51) Int. Cl.
*G09G 5/00* (2006.01)
*G06F 3/0481* (2013.01)
*G06F 3/14* (2006.01)

(52) U.S. Cl.
CPC ............ *G06F 3/0481* (2013.01); *G06F 3/1454* (2013.01); *G09G 2340/0407* (2013.01); *G09G 2340/125* (2013.01)

(58) Field of Classification Search
USPC .................................................... 345/629, 2.1
See application file for complete search history.

(56) References Cited

U.S. PATENT DOCUMENTS 6,097,441 A * 8/2000 Allport ......................... 348/552
7,280,851 B2 * 10/2007 Oba et al. ...................... 455/566
7,369,099 B2 * 5/2008 Arai et al. ...................... 345/1.1
8,122,357 B2 * 2/2012 Han et al. ...................... 715/717
8,401,681 B2 * 3/2013 Rosenblatt et al. ............. 700/94
8,458,363 B2 * 6/2013 Rosenblatt et al. ........... 709/248
2005/0080764 A1 * 4/2005 Ito .................................... 707/1
2008/0055190 A1 * 3/2008 Lee ................................ 345/2.1
2009/0132923 A1 * 5/2009 Han et al. ...................... 715/717
2009/0237325 A1 * 9/2009 Luo et al. ....................... 345/2.1
2009/0319900 A1 * 12/2009 Namai et al. .................. 715/717
2010/0060549 A1 * 3/2010 Tsern ............................. 345/2.1
2010/0082784 A1 * 4/2010 Rosenblatt et al. ........... 709/222
2010/0109973 A1 * 5/2010 Byun ............................. 345/2.1
2010/0257473 A1 * 10/2010 Kang ........................... 715/769
2010/0317332 A1 * 12/2010 Bathiche et al. .............. 455/418
2011/0037712 A1 * 2/2011 Kim et al. ..................... 345/173

* cited by examiner

*Primary Examiner* — M Good Johnson

(74) *Attorney, Agent, or Firm* — Birch, Stewart, Kolasch & Birch, LLP

(57) ABSTRACT

A method of managing content using an image display device includes reproducing and displaying first content in a first region of a screen of the image display device, displaying a first image representing a first mobile terminal connected to and communicating with the image display device and a second image representing second content stored in the first mobile terminal in a second region of the screen, receiving a first user command for selecting the second image, displaying a third image representing a device which will reproduce, store or receive the second content in a third region of the screen, receiving a second user command for selecting the device which will reproduce, store or receive the second content, and enabling the selected device to reproduce, store or receive the second content according to the second command.

18 Claims, 10 Drawing Sheets

1000
100
300
600
500
400
200

IMAGE DISPLAY DEVICE AND METHOD OF MANAGING CONTENT USING THE SAME

This application claims the benefit of Korean Patent Application No. 10-2011-0034152 filed on Apr. 13, 2011, which is hereby incorporated by reference as if fully set forth herein.

BACKGROUND OF THE INVENTION

1. Field of the Invention

The present invention relates to an image display device and a method of managing content using the same, and more particularly, to an image display device able to communicate with a mobile terminal and a method of managing content stored in the mobile terminal using the same.

2. Discussion of the Related Art

An image display device displays image information using a screen and a representative example thereof includes a television system for receiving a signal from a base station and displaying an image. Recently, with technological development, it is possible to access the Internet using an image display device such as a television. In addition, the image display device is connected to a mobile/portable terminal such as a mobile phone or a tablet computer by wire or wirelessly so as to achieve data communication between the image display device and the mobile terminal.

The mobile terminal is implemented as a multimedia player including functions such as photography and display of photos and playback of moving images, music or moving image files, or reception of games or broadcasts.

By data communication between the image display device and the mobile terminal, information stored in one of the image display device and the mobile terminal may be displayed or stored in the other of the image display device and the mobile terminal. At this time, there is a need for a display method and a content management method, which takes into consideration user convenience in data and content utilization.

SUMMARY OF THE INVENTION

Accordingly, the present invention is directed to an image display device and a method of managing content using the same that substantially obviate one or more problems due to limitations and disadvantages of the related art.

An object of the present invention is to provide an image display device which is able to increase user convenience when data communication between the image display device and a mobile terminal is performed and a method of managing content using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing content using an image display device includes reproducing and displaying first content in a first region of a screen of the image display device, displaying a first image representing a mobile terminal connected to and communicating with the image display device and a second image representing second content stored in the mobile terminal in a second region of the screen, receiving a first user command for selecting the second image, displaying a third image representing a device which will reproduce, store or receive the second content in a third region of the screen, receiving a second user command for selecting the device which will produce, store or receive the second content, and enabling the selected device to reproduce, store or receive the second content according to the second command.

The displaying of the first image and the second image may include displaying the first image and a terminal display menu for receiving a third user command for displaying a second mobile terminal connected to the image display device in addition to the mobile terminal in the second region.

The method may further include displaying a fourth image representing the second mobile terminal in the second region according to the selection of the terminal display menu. The method may further include enlarging the second region according to the selection of the terminal display menu and displaying the first image, the second image and the fourth image in the enlarged second region. The method may further include receiving a fourth user command for selecting the second image and the fourth image displayed in the enlarged second region, and transmitting the second content to the second mobile terminal according to the fourth command.

The first image may represent a screen displayed on the mobile terminal or the overall shape of the mobile terminal.

The device which will reproduce, store or receive the second content may include a second image display device and a data storage device connected to the image display device.

The second region and the third region may be displayed in the first region in the form of an On Screen Display (OSD).

The first command may be input by dragging the second image to the side of the first region. The second command may be input by dragging and dropping the second image to the side of the fourth image representing the device displayed in the third region.

The method may further include receiving a user input signal for dragging the second image to the outside of the screen, and displaying a sharing method selection menu for sharing the second content through an email server, a Social Network Service (SNS) server or a mobile terminal according to the user input signal.

The method may further include receiving a user input signal for dragging and dropping the second image to the first region, and displaying a reproduction/storage selection menu for receiving a user command for reproducing or storing the second content on or in the image display device according to the user input signal.

In another aspect of the present invention, an image display device includes a video output unit configured to display an image, an interface configured to transmit or receive data to or from a mobile terminal connected to and communicating with the image display device and receive a user command, and a controller configured to control the video output unit according to the user command received through the interface. The controller controls the video output unit to reproduce and display first content in a first region of a screen of the video output unit and to display a first image representing the mobile terminal and a second image representing second content stored in the mobile terminal in a second region of the screen. The interface receives a first user command for selecting the second image and outputs the first user command to the controller, and the controller controls the video output unit to display a third image representing a device which will reproduce, store or receive the second content in a third region of the screen according to the first command. The interface receives a second user command for selecting the device which will reproduce, store or receive the second content and outputs the second user command to the controller, and the controller controls the selected device to reproduce, store or receive the second content according to the second command.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
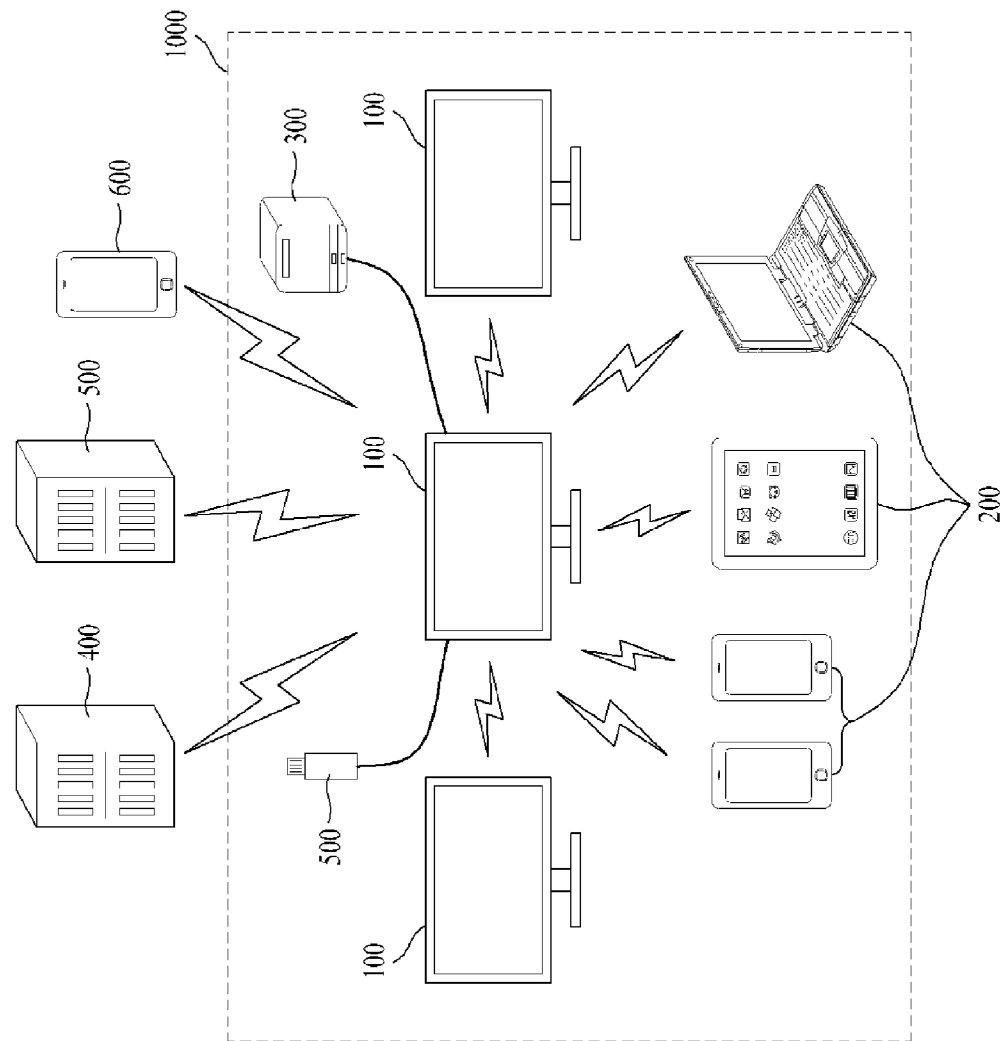
FIG. 1 is a schematic diagram showing a content management system to which a content management method according to an embodiment of the present invention is applied.

Reference will now be made in detail to the preferred embodiments of the present invention, examples of which are illustrated in the accompanying drawings. FIG. 1 is a schematic diagram showing a content management system to which a content management method according to an embodiment of the present invention is applied. Within a restricted space 1000 such as an office or a house, communication between various devices may be performed over a wired/wireless Local Area Network (LAN).

For example, as shown in FIG. 1, within one restricted space 1000, a plurality of image display devices 100, which is able to perform communication, such as a TV, a PC and a laptop computer may be present and a mobile terminal 200 able to perform communication with the image display device, such as a mobile phone and a tablet computer, may be present.

Within the restricted space 1000, a storage device 300, which is able to receive data from the image display device 100 and store the data, such as a Universal Serial Bus (USB) memory or a Network Attached Storage (NAS), may be present.

In this instance, the image display device 100 may be connected to a Social Network Service (SNS) server 400, an email server 500 and a remotely located mobile terminal 600 by wire or wirelessly so as to perform communication therebetween.

In the content management method according to the embodiment of the present invention, a method of enabling a user to more conveniently reproduce, copy and share content stored in the mobile terminal 200 connected to and communicating with the image display device 100 using the image display device 100 is provided. In the present invention, content refers to a variety of information provided through the Internet, computer communication, etc. and includes multimedia data such as moving images or photos and various applications.

Figure 2:
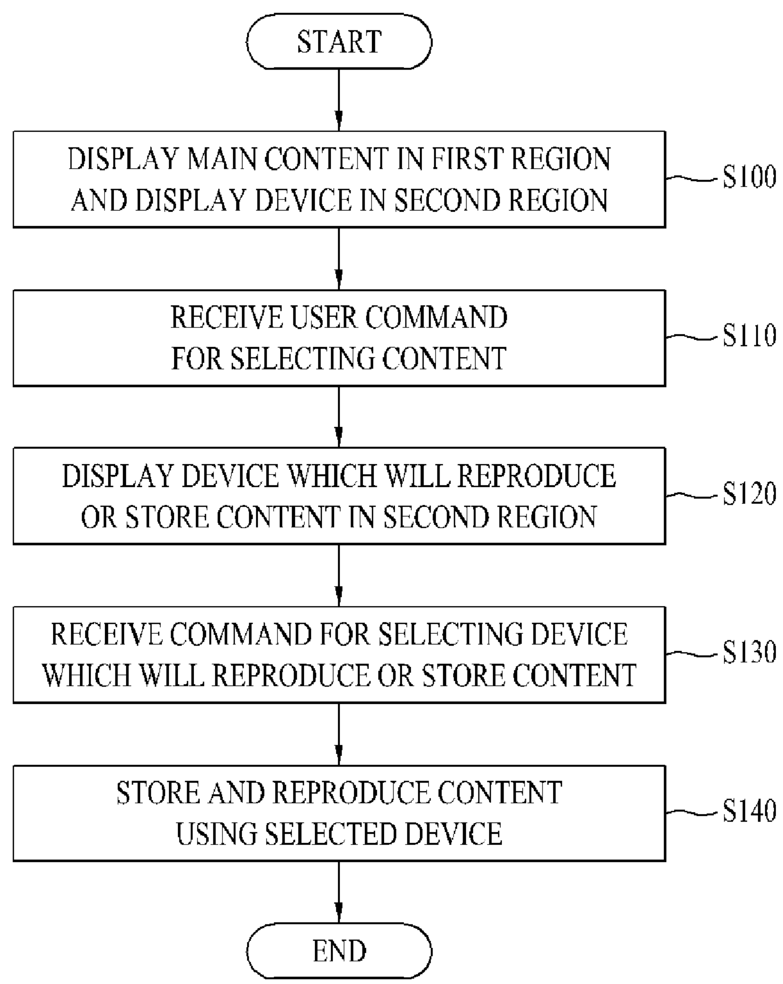
FIG. 2 is a flowchart illustrating a content management method according to an embodiment of the present invention.

Hereinafter, the content management method according to the embodiment of the present invention will be described in detail with reference to FIGS. 2 to 11. FIG. 2 is a flowchart illustrating the content management method according to the embodiment of the present invention.

Figure 3:
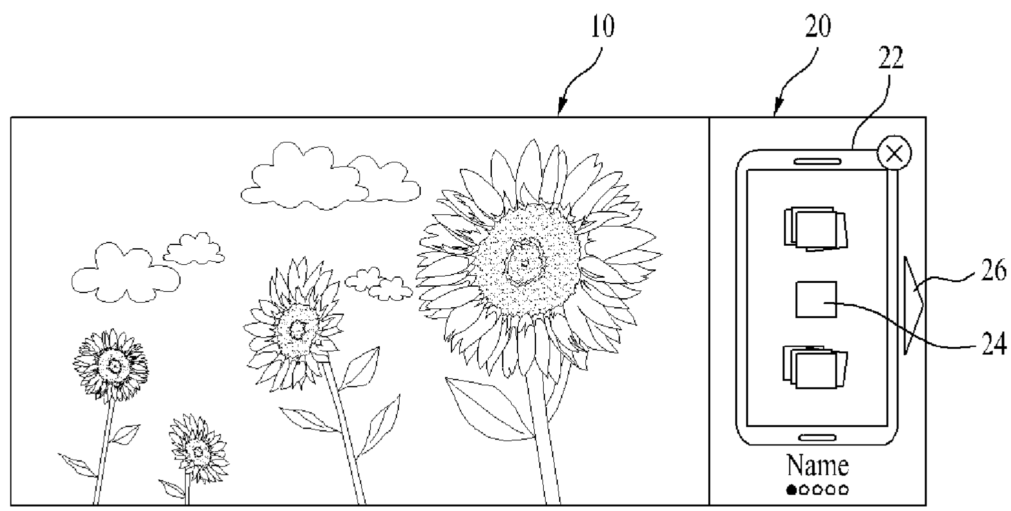
FIG. 3 is a schematic diagram showing a state in which displays first content and an image representing a mobile terminal connected to an image display device, in the image display device according to an embodiment of the present invention.

First, first content, that is, main content, is reproduced and displayed in a first region 10 of a screen of the image display device 100, and a first image 22 representing the mobile terminal 200 connected to and communicating with the image display device 100 and a second image 24 representing second content stored in the mobile terminal 200 are displayed (S100). In FIG. 3, the first content is displayed in the first region 10 of the image display device 100 and the first image 22 representing the mobile terminal 200 connected to the image display device 100 is displayed in the second region 20.

In order to perform the content management method according to the embodiment of the present invention, the image display device 100 searches for a mobile terminal 200 for communication automatically or in response to a user command. At this time, if a mobile terminal 200 connected to the image display device 100 is found, connection to the mobile terminal 200 is established and an image representing the mobile terminal 200 is displayed on a screen. In this instance, it may be necessary to input a password according to setting of the mobile terminal 200. Alternatively, if a user has already been identified through the image display device 100, only the mobile terminal 200 of a user having access rights is connected so as to be displayed on the screen.

The first content includes all content which is able to be reproduced on the image display device 100, such as broadcast programs, movies or web content.

As shown in FIG. 3, the first image 22 representing the mobile terminal 200 may be the overall shape of the mobile terminal 200 including the current display screen of the mobile terminal 200. Information regarding the shape of the mobile terminal 200 may be directly received from the mobile terminal 200 or identification such as a model name may be received from the mobile terminal 200 and then information regarding the shape of the mobile terminal 200 may be received from a separate server based on the identification. Information regarding the display screen of the mobile terminal 200 may be received from the mobile terminal 200 as pixel information of the display screen.

Alternatively, the first image 22 may be a screen displayed on the mobile terminal 200 excluding the shape of the mobile terminal 200 in the second region 20. In this case, only the display screen excluding the frame shape of the mobile terminal 200 is displayed in the second region 20.

Figure 4:
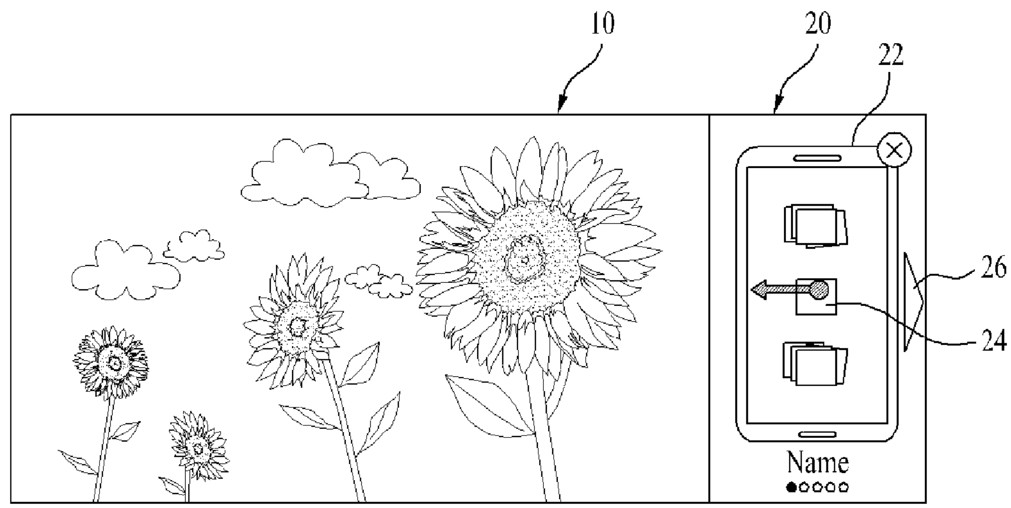
FIG. 4 is a schematic diagram showing a state in which a user selects content stored in the mobile terminal.

Next, a first user command for selecting the second image 24 representing the second content is received as an object to be reproduced on another device or to be copied to another device (S110). FIG. 4 is a schematic diagram showing a state in which the user selects content stored in the mobile terminal 200. As shown in FIG. 4, for example, the first command may be input by dragging the second image 24 to the side of the first region 10. The first command may be input by another input operation such as an operation of pressing the second image 24 for a long time in addition to the drag operation and the present invention is not limited in terms of the user input operation. In order to receive such a user input, the second image 24 may be displayed in the second region 20 in the form of a Graphical User Interface (GUI).

In order to receive a user command for the second content stored in the mobile terminal 200 using the second image 24 displayed on the image display device 100, the image display device 100 receives coordinate information of the screen of the mobile terminal 200 from the mobile terminal 200 and associates the coordinate information of the screen of the image display device 100 with coordinate information of the screen of the mobile terminal 200. Thus, it is possible to determine an object desired by the user and perform an operation corresponding thereto. A GUI menu displayed on the mobile terminal 200 may be equally displayed on the screen of the image display device 100 and the user may input a command for the second content through the screen of the image display device 100.

Meanwhile, the user may input the above command using a variety of input means included in the image display device 100. For example, the user may select the second image 24 through a selection key included in a general remote controller and press a directional key indicating movement to the side of the first region 10 in a state of pressing the selection key, thereby inputting a command for dragging and dropping the second image 24 to the side of the first region 10.

The user may input the above command through a gesture performed using a motion sensing remote controller. That is, the user may move a cursor which moves according to movement of the motion sensing remote controller to the second image 24 and press a selection key so as to select the second image 24. Alternatively, the user may move the second image 24 to the side of the first region 10 in a state of pressing the selection key so as to input a drag-and-drop command.

In addition, when the image display device 100 supports a gesture recognition user interface, the above input operation may be performed by a user gesture. In addition, when the image display device 100 includes a touch pad, a user command may be input through touch input. This is only an example of the present invention. In the present invention, the user may input a desired command through any possible input means.

Figure 5:
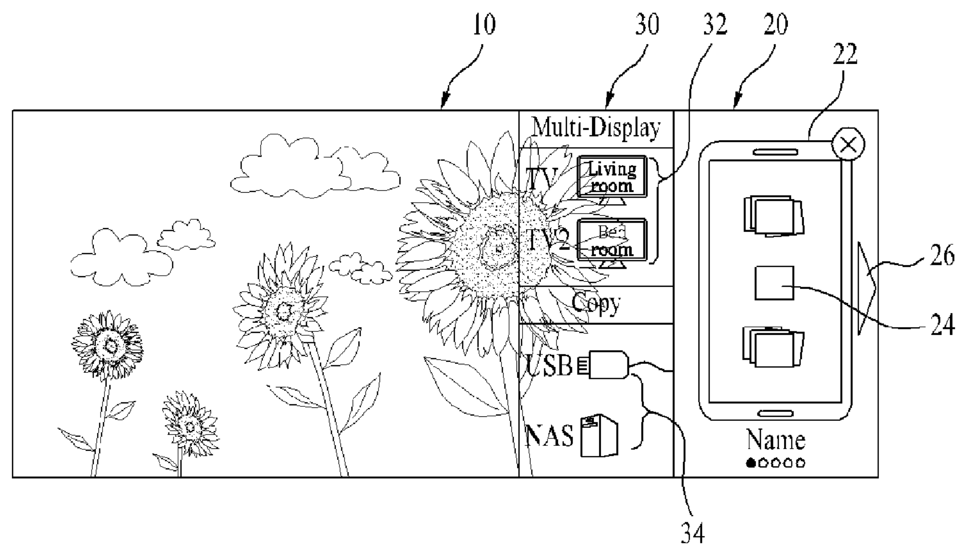
FIG. 5 is a schematic diagram showing a state of displaying an image for selecting a device which will reproduce or store content according to user selection.

Next, third images 32 and 34 representing devices which will reproduce, store or receive the second content are displayed in a third region 30 of the screen according to the first user command (S120). FIG. 5 is a schematic diagram showing a state of displaying the third region 30 for selecting a device which will reproduce or store content according to user selection. The device which will reproduce, store or receive the second content may include other image display devices and the data storage device 300 connected to the image display device 100.

For example, as shown in FIG. 5, an image 32 representing separate image display devices may be displayed in the third region 30, as devices for receiving the second content from the mobile terminal 200 and reproducing the second content. An image 34 representing a USB memory or a NAS may be displayed as devices for copying and storing the second content.

The second region 20 and the third region 30 displayed on the screen of the image display device 100 may be displayed in the first region 10 in the form of an On Screen Display (OSD). The second region 20 and the third region may be displayed in the first region in the form of a translucent OSD. Alternatively, as necessary, regions may be separately displayed on the screen.

Figure 6:
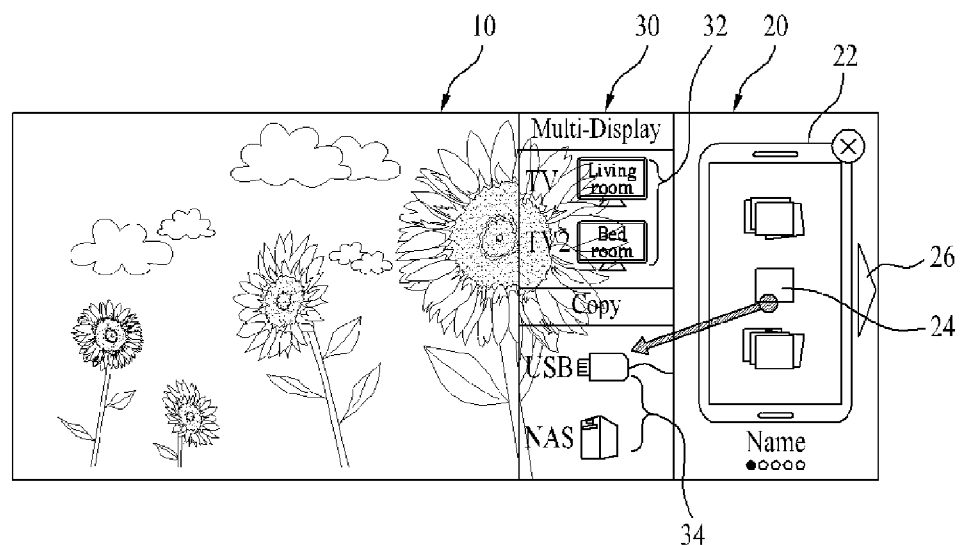
FIG. 6 is a schematic diagram showing a method of enabling a user to input a command for copying the content stored in a mobile terminal to a selected device.

Next, a second user command for selecting a device which will reproduce, store or receive the content in the displayed third images 32 and 34 is received. FIG. 6 is a schematic diagram showing a method of enabling the user to input a user command for copying the content stored in the mobile terminal 200 to a selected device. At this time, the second command may be input by dragging and dropping the second image 24 representing the second content to the side of the third images 32 and 34 representing the devices displayed in the third region 30. At this time, the user may input a desired command through any possible input means and the second command may be input by another input operation in addition to the drag-and-drop operation.

Next, the second content is reproduced on, stored in or transmitted to the selected device according to the second command (S140). For example, as shown in FIG. 6, if a user selects an image representing a USB memory, the second content stored in the mobile terminal 200 is copied to and stored in the USB memory connected to the image display device 100. As another example, if the user selects another image display device, the second content stored in the mobile terminal 200 is transmitted to and reproduced on another image display device 100.

Meanwhile, as shown in FIG. 3, a terminal display menu 26 for receiving a third user command for checking other mobile terminals 200 connected to and communicating with the image display device 100 in addition to the mobile terminal 200 may be displayed in the second region 20 in the form of a GUI. At this time, when the user selects the displayed terminal display menu 26, the other mobile terminals 200 connected to and communicating with the image display device 100 are sequentially displayed in the second region 20 one by one.

Figure 7:
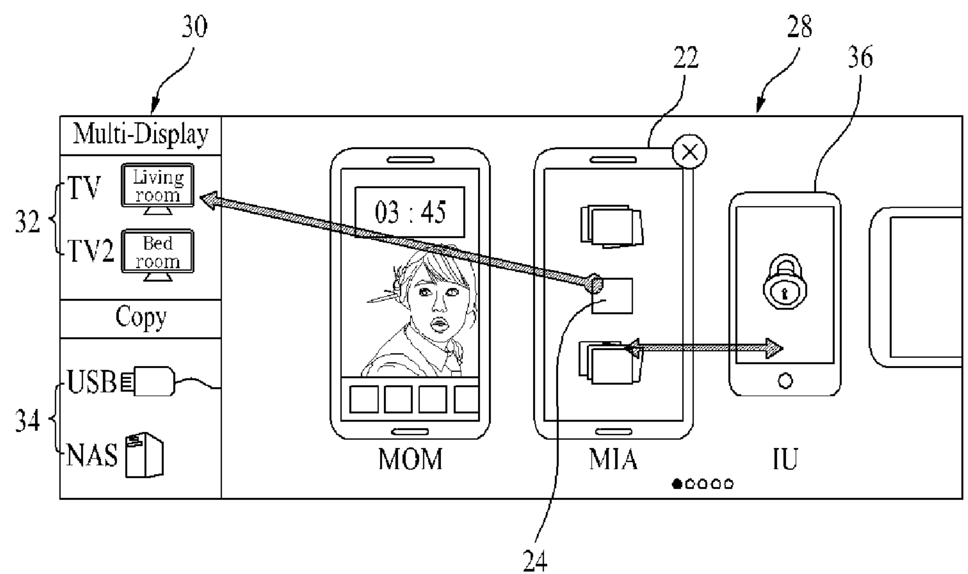
FIG. 7 is a schematic diagram showing a state in which a second region is enlarged and mobile terminals connected to the image display device are displayed.

Hereinafter, a content management method according to a second embodiment of the present invention will be described in detail with reference to FIG. 7. In the present embodiment, when the user selects the terminal display menu 26 shown in FIG. 3, the second region 20 may be enlarged and the first image 22 representing the mobile terminal 200, the second image 24 representing the second content stored in the mobile terminal 200 and a fourth image 36 representing another selectable mobile terminal may be displayed in the enlarged second region 28. At this time, the user may select an operation of pressing the terminal display menu 26 for a long time so as to enlarge the second region 28. FIG. 7 is a schematic diagram showing a state in which the second region is enlarged according to user input and the mobile terminals 200 connected to the image display device 100 are displayed. As shown in FIG. 7, in the present embodiment, the fourth image 36 representing a plurality of mobile terminals connected to and communicating with the image display device 100 is displayed.

Similarly to the first embodiment, the first user command for selecting the second content may be received. The third images 32 and 34 representing the devices which will reproduce, store or receive the second content are displayed in the third region 30 of the image display device 100. When the second user command for selecting the device which will reproduce, store and receive the content is received, the second content may be reproduced on, stored in or transmitted to the selected device.

In the present embodiment, an operation for copying and moving the second content stored in the mobile terminal 200 to another mobile terminal may be performed. That is, if a fourth user commend for selecting the second image 24 representing the second content displayed in the enlarged second region 28 and the fourth image 36 representing another mobile terminal is received, the second content may be transmitted to the second mobile terminal according to the received fourth command.

For example, the fourth command may be input by dragging and dropping the second image 24 to the side of the fourth image 36 representing the mobile terminal different from the mobile terminal 200 in which the second content is stored. The user may input a desired command through any possible input methods and the fourth command may be input by another input operation in addition to the drag-and-drop operation.

Figure 8:
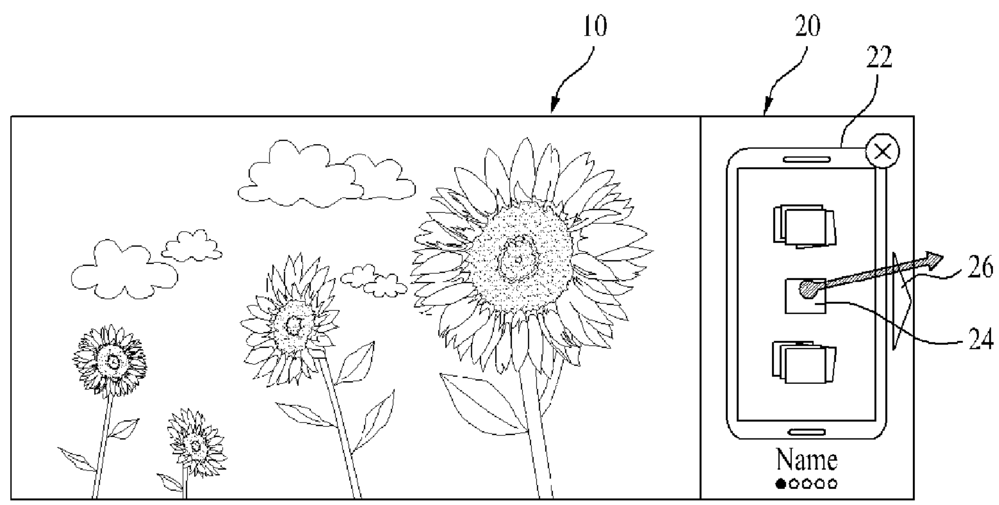
FIG. 8 is a schematic diagram showing a method of enabling a user to input a command for selecting and sharing content stored in a mobile terminal.
Figure 9:
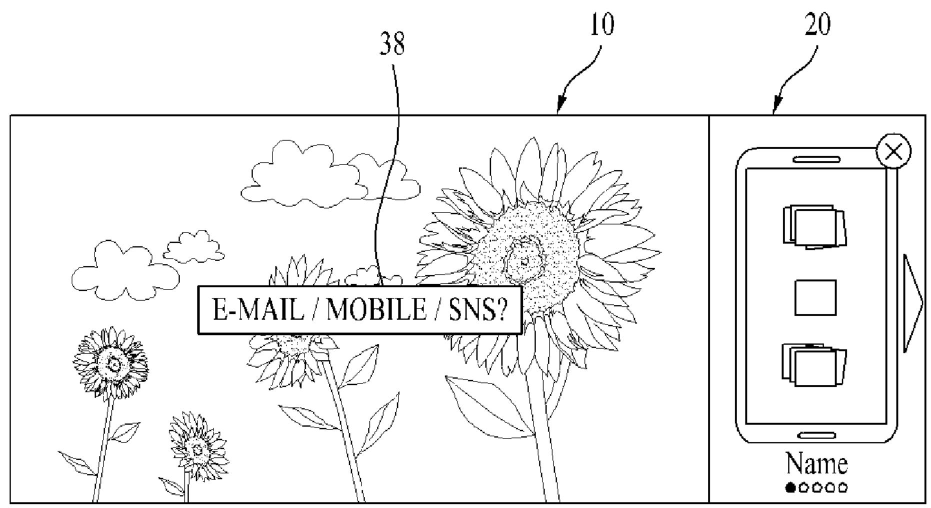
FIG. 9 is a schematic diagram showing a state of displaying a sharing method selection menu for selecting a sharing method of content stored in the mobile terminal according to a user command.

Hereinafter, a content management method according to a third embodiment of the present invention will be described in detail with reference to FIGS. 8 and 9. In the present embodiment, a method of sharing the second content stored in the mobile terminal 200 with another user is provided. FIG. 8 is a schematic diagram showing a method of enabling the user to input a fifth command for selecting and sharing content stored in the mobile terminal 200. FIG. 9 is a schematic diagram showing a state of displaying a sharing method selection menu 38 for selecting a sharing method of content stored in the mobile terminal 200 according to a user command.

As shown in FIG. 8, the user may input a fifth command for sharing the second content by dragging the second image 24 to the outside of the screen. In this case, as shown in FIG. 9, the sharing method selection menu 38 for sharing the second content through the email server 500, the SNS server 400 or the mobile terminal 600 is displayed according to user input in the form of a GUI. At this time, the user may input a desired command through any possible input means and the fifth user command may be input by another input operation in addition to the drag operation.

If the user selects a sharing method through the sharing method selection menu 38, the second content may be shared with another user through the SNS server 400, the email server 500 or the mobile terminal 600.

Figure 10:
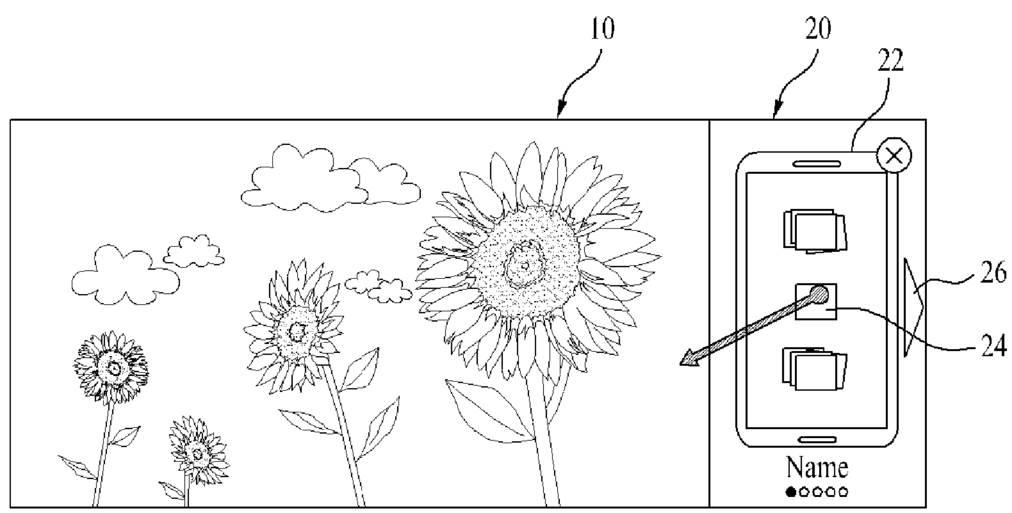
FIG. 10 is a schematic diagram showing a method of inputting a user command for copying or reproducing content stored in the mobile terminal to or on the image display device.
Figure 11:
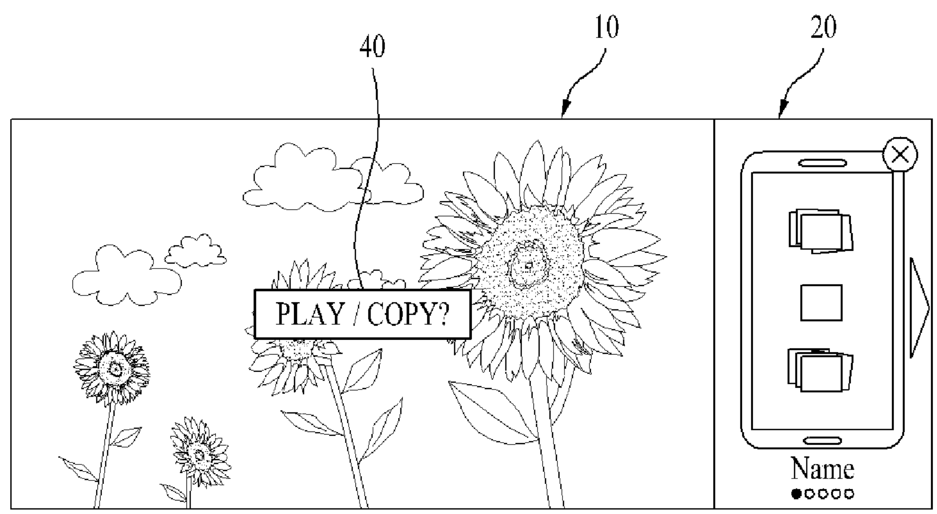
FIG. 11 is a schematic diagram showing a state of displaying a reproduction/copy selection menu for reproducing or copying content on or to the image display device.

Hereinafter, a content management method according to a fourth embodiment of the present invention will be described in detail with reference to FIGS. 10 and 11. FIG. 10 is a schematic diagram showing a method of inputting a sixth user command for copying or reproducing content stored in the mobile terminal 200 to or on the image display device 100. FIG. 11 is a schematic diagram showing a state of displaying a reproduction/copy selection menu 40 for reproducing or copying content on or to the image display device 100.

In the present embodiment, the sixth command may be input by an operation for dragging and dropping the second image 24 to the first region 10. At this time, the reproduction/copy selection menu 40 for receiving the user command for reproducing or storing the second content is displayed on the screen of the image display device 100 according to the user input. The sixth user command may be input by another input operation in addition to the drag operation.

If the user selects that the content is reproduced on or copied to the image display device 100 through the displayed reproduction/copy selection menu 40, the image display device 100 performs the selected function.

Figure 12:
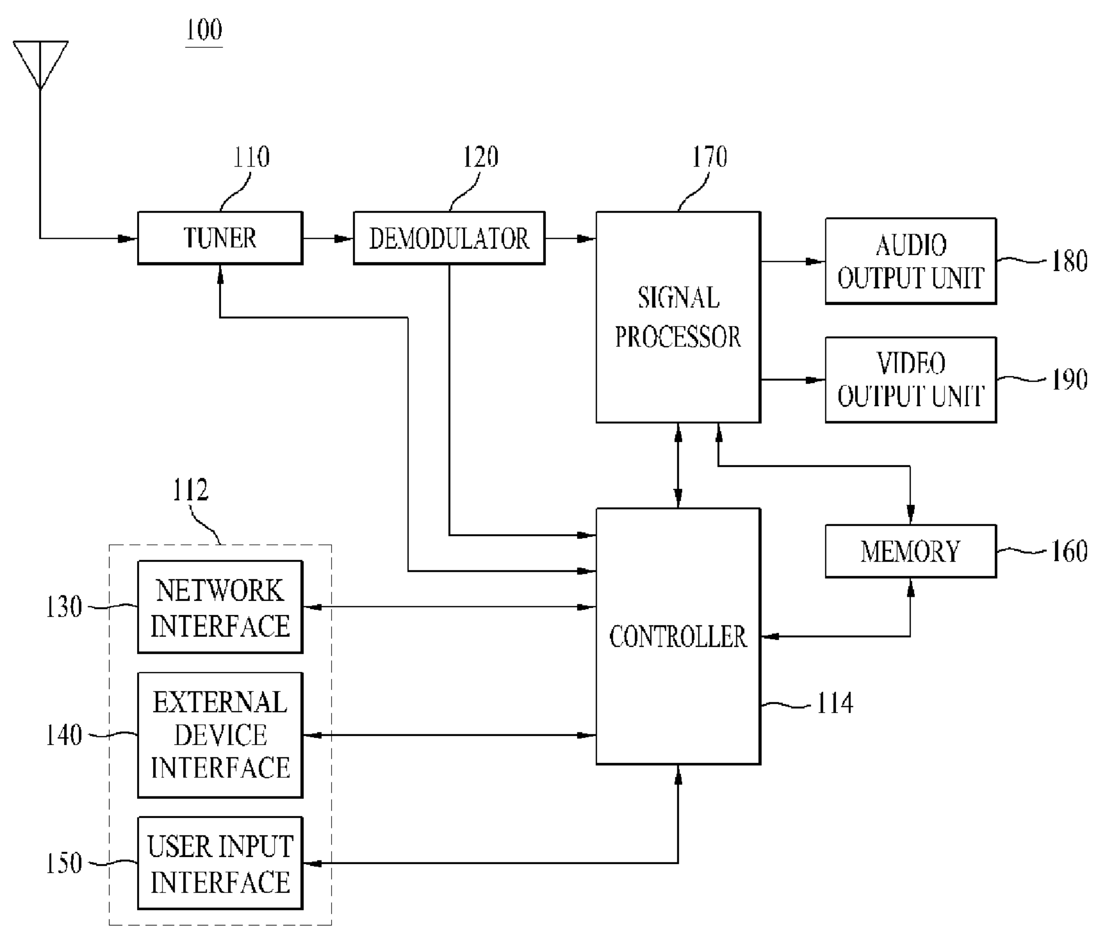
FIG. 12 is a block diagram showing an image display device according to an embodiment of the present invention.

Hereinafter, the image display device 100 according to the embodiment of the present invention will be described in detail with reference to FIGS. 12 to 14. FIG. 12 is a block diagram showing the image display device 100 according to the embodiment of the present invention.

As shown in FIG. 12, the image display device 100 includes a tuner 110, a demodulator 120, an interface 112, a controller 114, a memory 160, a signal processor 170, an audio output unit 180 and a video output unit 190.

The tuner 110 tunes to a Radio Frequency (RF) broadcast signal corresponding to a channel selected by a user from among a plurality of RF broadcast signals received through an antenna or each of all previously received channels and downconverts the tuned RF broadcast signal into a digital Intermediate Frequency (IF) signal or a baseband video or audio signal. If the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF output from the tuner 110 may be directly input to the signal processor 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF. For example, if the digital IF signal DIF output from the tuner 110 is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder, a de-interleaver and a Reed-Solomon decoder so as to perform Trellis decoding, de-interleaving and Reed-Solomon decoding. For example, if the digital IF signal DIF output from the tuner 110 is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder, a de-interleaver, and a Reed-Solomon decoder so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the signal processor 170. The signal processor performs demultiplexing and A/V signal processing with respect to the TS and outputs the processed video and audio signals to the video output unit 190 and the audio output unit 180, respectively.

The interface 112 transmits or receives data to or from the mobile terminal 200 connected to and communicating with the image display device 200 and receives a user command. The interface 112 includes a network interface 130, an external device interface 140 and a user input interface 150.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may receive content or data provided over the Internet or from a Content Provider (CP) or a Network Provider (NP) over a network. The network interface 130 may receive content such as movies, advertisements, games, VoD, and broadcast signals, and information related to the content from the CP or the NP. Also, the network interface 130 may receive update information about firmware and an update file from the NP. The network interface 130 may transmit data over the Internet or to the CP or the NP.

The network interface 130 is connected to, for example, an Internet Protocol (IP) TV, for bidirectional communication. The network interface 130 may receive a video, audio or data signal processed by an IPTV set-top box and transmit the signal to the signal processor 170 or transmit signals processed by the signal processor 170 to the IPTV set-top box.

The external interface 140 is configured to transmit or receive data to or from an external device. For data transmission or reception, the external device interface 140 may include an A/V Input/Output (I/O) unit (not shown) and/or a wireless communication module (not shown). The external device interface 140 may be connected to an external device such as a Digital Versatile Disc (DVD) player, a Blu-ray player, a game console, a camera, a camcorder, or a computer (e.g., a laptop computer), wirelessly or by wire.

Then, the external device interface 140 externally receives video, audio, and/or data signals from the external device and transmits the received input signals to the signal processor 170 of the image display device 100. In addition, the external device interface 140 may output video, audio, and data signals processed by the signal processor 170 to the external device. In order to receive or transmit audio, video and data signals from or to the external device, the external device interface 140 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The external device interface 140 may be connected to various set-top boxes through at least one of the above-described ports and may thus perform an I/O operation with the various set-top boxes.

The user input interface 150 transmits a signal received from the user to the controller 114 or transmits a signal received from the controller 114 to the user. For example, the user input interface 150 may receive user input signals such as a power-on/off signal, a channel selection signal, and a screen setting signal from a remote controller (not shown) or may transmit a signal received from the controller 114 to the remote controller, according to various communication schemes, for example, RF communication and IR communication.

For example, the user input interface 150 may provide the controller 114 with user input signals received from local keys (not shown), such as inputs of a power key, a channel key, and a volume key, and setting values.

Also, the user input interface 150 may transmit a user input signal received from a sensor unit (not shown) for sensing a user gesture to the controller 114 or transmit a signal received from the controller 114 to the sensor unit (not shown). The sensor unit may include a touch sensor, a voice sensor, a position sensor, a motion sensor, etc.

The memory 160 may store a program for signal processing and control of the controller 114 and the signal processor 170 and may store the processed video, audio or data signal. In addition, the memory 160 may temporarily store the video, audio or data signal input through the external device interface 140 and store data regarding a predetermined broadcast channel through a channel storage function such as a channel map.

The memory 160 may include a storage medium of at least one of a variety of types including a flash memory type, a hard disk type, a multimedia card micro type, a card memory type (for example, SD or XD memory), RAM, Static Random Access Memory (SRAM), ROM or Electrically Erasable Programmable Read-Only Memory (EEPROM). The image display device 100 may reproduce a file (a moving image file, a still image file, a music file, a text file, etc.) stored in the memory 160 and provide the file to the user.

While the memory 160 is shown in FIG. 12 as configured separately from the controller 114, to which the present invention is not limited, the memory 160 may be incorporated into the controller 114, for example.

The signal processor 170 may demultiplex the TS received from the tuner 110, the demodulator 120, or the external device interface 140 into a number of signals and process the demultiplexed signals into audio and video data.

The audio signal processed by the signal processor 170 may be audibly output through the audio output unit 180. Also, the audio signal processed by the signal processor 170 may be transmitted to the external output device through the external device interface 140. The detailed configuration of the signal processor 170 will be described below.

The video signal processed by the signal processor 170 may be displayed as an image on the video output unit 190. The video signal processed by the signal processor 170 may also be transmitted to an external output device through the external device interface 140. In addition, the signal processor 170 may be included in the controller 114 and the present invention is not limited to the above configuration.

In addition, the controller 114 may control the overall operation of the image display device 100. For example, the controller 114 controls the signal processor 170 and the video output unit 190 according to a user command received through the interface 112. The controller 114 or 170 controls the tuner 110 to tune to a RF broadcast corresponding to a channel selected by the user or a previously-stored channel. In addition, the controller 114 may control the image display device 100 according to a user command input through the user input interface 150 or an internal program. For example, the controller 114 controls the tuner 110 to receive a signal of a channel selected according to a specific channel selection command received through the user input interface 150 and controls the signal processor 170 to process a video, audio and/or data signal of the selected channel.

The controller 114 controls the signal processor 170 to output the processed video or audio signal along with information about the user-selected channel to the video output unit 190 or the audio output unit 180.

As another example, the controller 114 controls the signal processor 170 to output a video or audio signal received from an external device such as a camera or a camcorder through the external device interface 140 to the video output unit 190 or the audio output unit 180 according to an external device video playback command received through the external device interface 150.

The controller 114 may control the video output unit 190 to display images through the signal processor 170. For instance, the controller 114 may control the video output unit 190 to display a broadcast image received from the tuner 110, an externally input image received through the external device interface 140, an image received through the network interface 130, or an image stored in the memory 160. The image displayed on the video output unit 190 may be a Two-Dimensional (2D) or Three-Dimensional (3D) still image or moving picture.

The audio output unit 180 may receive a processed audio signal (e.g., a stereo signal, a 3.1-channel signal or a 5.1-channel signal) from the signal processor 170 and output the received audio signal as sound. The audio output unit 180 may employ various speaker configurations.

The video output unit 190 may convert a processed video signal, a processed data signal, and an OSD signal received from the signal processor 170 or a video signal, a data signal and a control signal received from the external device interface 140, thereby generating driving signals. The video output unit 190 may be various types of displays such as a Plasma Display Panel (PDP), a Liquid Crystal Display (LCD), an Organic Light-Emitting Diode (OLED) display, a flexible display, and a 3D display. The video output unit 190 may also be a touchscreen that can be used not only as an output device but also as an input device.

To sense a user gesture, the image display device 100 may further include the sensor unit (not shown) that has at least one of a touch sensor, a voice sensor, a position sensor, and a motion sensor, as stated before. A signal sensed by the sensor unit (not shown) may be output to the controller 114 through the user input interface 150.

The image display device 100 may be a fixed digital broadcast receiver capable of receiving at least one of an ATSC (8-VSB) digital broadcast, a DVB-T (COFDM) digital broadcast, or an ISDB-T (BST-OFDM) digital broadcast or a mobile digital broadcast receiver capable of receiving at least one of a terrestrial DMB digital broadcast, a satellite DMB digital broadcast, an ATSC-M/H digital broadcast, a DVB-H (COFDM) digital broadcast or a Media Forward Link Only digital broadcast. In addition, the image display device 100 may be a cable, satellite or IPTV digital broadcast receiver.

FIG. 12 is a block diagram of the image display device 100 according to one embodiment of the present invention. The components of the block diagram may be combined, added or omitted according to the type of the image display device 100. That is, two or more components may be combined into one component or one component may be divided into two or more components, as necessary. The functions of the blocks are intended to describe, and is not intended to limit the scope of the present invention.

Figure 13:
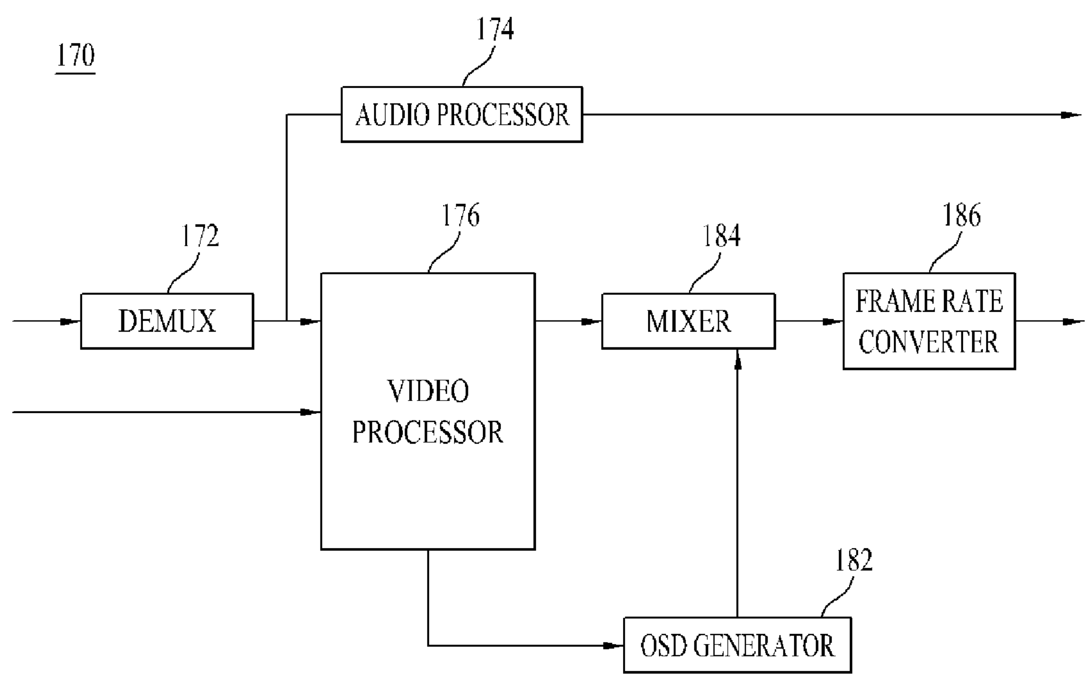
FIG. 13 is a block diagram showing the configuration of a signal processor of FIG. 12.

FIG. 13 is a block diagram of the signal processor 170 shown in FIG. 12. As shown in FIG. 13, the signal processor 170 may include a DEMUX 172, a video processor 176, an audio processor 174, an OSD generator 182, a mixer 184, and a Frame Rate Converter (FRC) 186. The signal processor 170 may further include a data processor (not shown).

The DEMUX 172 demultiplexes an input stream. For example, the DEMUX 172 may demultiplex an MPEG-2 TS into a video signal, an audio signal, and a data signal. The stream signal input to the DEMUX 172 may be received from the tuner 110, the demodulator 120 or the external device interface 140.

The audio processor 174 may process the demultiplexed audio signal. For audio signal processing, the audio processor 174 may have a plurality of decoders.

The video processor 176 may decode the demultiplexed video signal. The video processor 176 may include various types of decoders. For example, the video processor 176 may include at least one of an MPEG-2 decoder, an H.264 decoder, an MPEG-C decoder (MPEG-C part 3), an MVC decoder and an FTV decoder. In addition, the video processor 176 may include a 3D video decoder for decoding a 3D video signal.

The OSD generator 182 generates an OSD signal autonomously or according to user input. For example, the OSD generator 182 may generate signals by which a variety of information is displayed as graphics or text on the video output unit 190, based on a user text input signal. The generated OSD signal may include various data such as a UI screen, a variety of menu screens, widgets, icons, etc. of the image display device 100. The generated OSD signal may include a 2D object or a 3D object.

The mixer 184 may mix the decoded video signal processed by the video processor 176 with the OSD signal generated by the OSD generator 182. Each of the OSD signal and the decoded video signal may include at least one of a 2D signal and a 3D signal. The mixed video signal is provided to the FRC 186.

The FRC 186 may change the frame rate of an input image signal. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames.

The FRC 186 may output the received frame rate without conversion. Preferably, if a 2D video signal is input, the FRC 186 may output the frame rate without conversion. In contrast, if a 3D video signal is input, the frame rate may be converted as described above.

Figure 14:
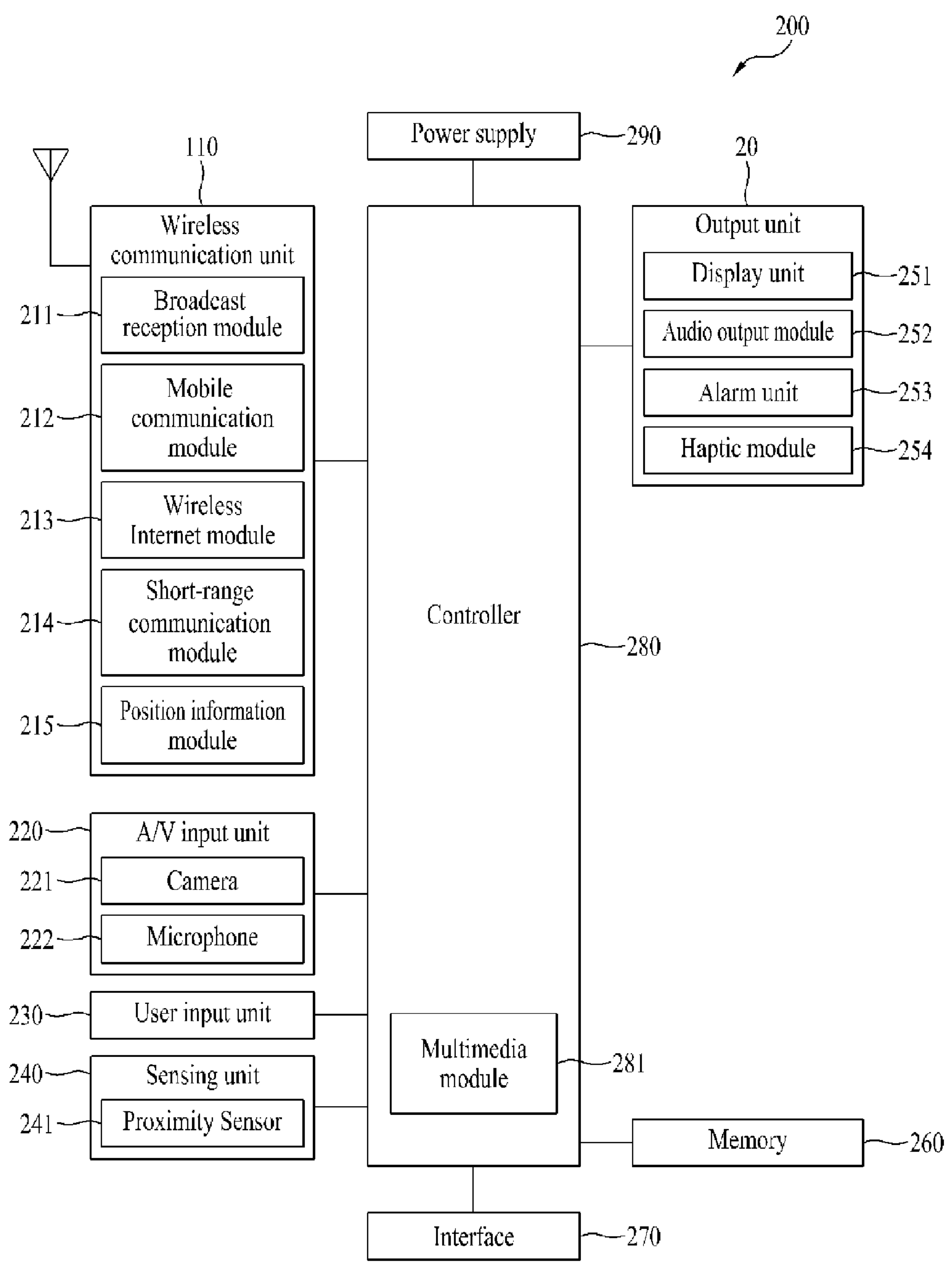
FIG. 14 is a block diagram showing a mobile terminal according to an embodiment of the present invention.

FIG. 14 is a block diagram showing the mobile terminal 200 which can communicate with the image display device 100 according to the embodiment of the present invention. As shown in FIG. 14, the mobile terminal 200 includes a wireless communication module 210, an audio/video (A/V) input unit

220, a user input unit 230, a sensing unit 240, an output unit 250, a memory 260, a terminal interface 270, a terminal controller 280 and a power supply 290. Since the components shown in FIG. 14 are not mandatory, the components included in the mobile terminal 200 may be omitted or additional components may be added.

Hereinafter, the components of the mobile terminal 200 will be described in detail.

The wireless communication module 210 may include one or more modules for performing wireless communication between the mobile terminal 200 and a wireless communication system or the mobile terminal 200 and a network in which the mobile terminal 200 is located. For example, the wireless communication module 210 may include a broadcast reception module 211, a mobile communication module 212, a wireless Internet module 213, a short-range communication module 214 and a position information module 215.

The broadcast reception module 211 receives a broadcast signal and/or broadcast-related information from an external broadcast management server through a broadcast channel.

The broadcast channel may include a satellite channel and a terrestrial channel. The broadcast management server refers to a server for generating and transmitting a broadcast signal and/or broadcast-related information or a server for receiving and transmitting a previously generated broadcast signal and/or broadcast-related information to a terminal. The broadcast signal may include not only a TV broadcast signal, a radio broadcast signal and a data broadcast signal but also a broadcast signal in which a TV broadcast signal or a radio broadcast signal is combined with a data broadcast signal.

The broadcast-related information refers to information regarding a broadcast channel, a broadcast program or a broadcast server provider. The broadcast-related information may be provided over a mobile communication network. In this case, the broadcast-related information may be received by the mobile communication module 212.

The mobile communication module 212 transmits or receives a wireless signal to or from at least one of a base station, an external terminal and a server over a mobile communication network such as Global System for Mobile communications (GSM), Code Division Multiple Access (CDMA), or Wideband CDMA (WCDMA) (to which the present invention is not limited). The wireless signal may include a voice call signal, a video call signal or various types of data associated with transmission and reception of a text/multimedia message.

The wireless Internet module 213 is an internal or external module for wireless Internet access which may be provided to the mobile terminal 200. For wireless Internet access, a Wireless Local Area Network (WLAN) (i.e., Wi-Fi), Wireless Broadband (Wibro), World Interoperability for Microwave Access (WiMax), High Speed Downlink Packet Access (HSDPA), GSM, CDMA, WCDMA, Long Term Evolution (LTE) (to which the present invention is not limited) may be used.

Since the wireless Internet access using Wibro, HSDPA, GSM, CDMA, WCDMA or LTE is accomplished over a mobile communication network, the wireless Internet module 213 for wireless Internet access over the mobile communication network may be regarded as the mobile communication module 212.

The short-range communication module 214 performs short range communication. For short-range wireless communication, Bluetooth, Radio-Frequency IDentification (RFID), Infrared Data Association (IrDA), Ultra WideBand (UWB), and ZigBee may be used.

The position information module 215 acquires the position of the mobile terminal 200 and representative examples thereof include a Global Position System (GPS) module. The GPS module 215 may calculate distance information and accurate time information from three or more satellites and apply triangulation to the calculated information, thereby accurately calculating current 3-dimensional position information based on latitude, longitude and altitude. A method of calculating position and time information using three satellites and correcting an error of the calculated position and time information using another satellite may be used. In addition, the GPS module 215 may continue to calculate the current position in real time so as to calculate speed information.

Referring to FIG. 14, the A/V input unit 220 inputs an audio signal or a video signal and may include a camera 221 and a microphone 222. The camera 221 processes an image frame such as a still image or a moving image obtained by an image sensor in a video communication mode or an image capture mode. The processed image frame may be displayed on a display 251.

An image frame processed by a camera 221 may be stored in the memory 260 or transmitted to an external device through the wireless communication module 210. Two or more cameras 221 may be included according to use environments.

The microphone 222 receives an external audio signal in a call mode, a recording mode or a voice recognition mode and processes the audio signal into electrical voice data. If the processed voice data is in a call mode, the processed voice data may be converted into a format transmittable to a mobile communication base station through the mobile communication module 212 so as to be output. The microphone 222 may perform various noise elimination algorithms for eliminating noise occurring when the external audio signal is received.

The user input unit 230 generates input data enabling the user to control the operation of the terminal. The user input unit 230 may include a keypad, a dome switch, a touchpad (static pressure/static electrical), a jog wheel and a jog switch.

The sensing unit 240 detects a current state of the mobile terminal 200 such as whether the mobile terminal 200 is opened or closed, the position of the mobile terminal 200, the orientation of the mobile terminal 200 or deceleration/acceleration of the mobile terminal 200 and generates a sensing signal for controlling the operation of the mobile terminal 200. The sensing unit 240 may include a gyroscope sensor, an acceleration sensor, a geomagnetic sensor, etc. For example, the sensing unit 240 may sense whether the mobile terminal 200 is opened or closed when the mobile terminal 200 is a slide phone. The sensing unit 240 may also be responsible for sensing functions associated with whether or not the power supply unit 290 is supplying power or whether or not the interface unit 270 is coupled to an external device. The sensing unit 240 may include a proximity sensor 241.

The output unit 250 is provided to output an audio or video signal or a tactile signal and may include the display unit 251, an audio output module 252, an alarm unit 253, a haptic module 254, and a projector module 255.

The display unit 251 displays (outputs) information processed in the mobile terminal 200. For example, when the mobile terminal 200 is in a communication mode, the display unit 251 displays a communication-related User Interface (UI) or Graphical User Interface (GUI). When the mobile terminal 200 is in a video communication mode or an image capture mode, the display unit 251 may display captured or received images or may display a corresponding UI or GUI.

The display unit 251 may include at least one of a liquid crystal display (LCD), an organic light-emitting diode (OLED), and a 3D display.

Two or more display units 251 may be provided according to implementations of the mobile terminal 200. For example, a plurality of display units may be separately or integrally provided on one surface of the mobile terminal 1900 or may be respectively provided on different surfaces of the mobile terminal 200.

If the display unit 251 and a sensor (hereinafter, referred to as a touch sensor) for detecting a touch operation have a layered structure (hereinafter, referred to as a touchscreen), the display unit 251 may function as an input device as well as an output device. The touch sensor may be a touch film, a touch sheet or a touch pad.

The touch sensor may be configured to convert a change in pressure applied to a specific portion of the display unit 251 or a change in capacitance generated in a specific portion of the display unit 251 into an electrical input signal. The touch sensor may be configured to detect not only a touch location and area but also touch pressure.

If a touch input of the touch sensor is detected, a signal(s) corresponding thereto is sent to a touch controller. The touch controller processes the signal(s) and then transmits data corresponding to the processed signal(s) to the terminal controller 280. Thus, the terminal controller 280 may check which portion of the display unit 251 is touched.

The proximity sensor 241 may be disposed near the touchscreen or in an internal region of the mobile terminal 200 surrounded by the touchscreen. The proximity sensor 241 can detect the presence or absence of an object that is approaching or near to a predetermined detection surface without physical contact based on electromagnetic force or infrared rays. The proximity sensor has long life span and a wider variety of applications as compared to a contact sensor.

Examples of the proximity sensor 241 include a transmission photoelectric sensor, a direct reflection photoelectric sensor, a mirror reflection photoelectric sensor, a high-frequency oscillation proximity sensor, a capacitive proximity sensor, a magnetic proximity sensor, and an infrared proximity sensor. If the touchscreen is static electrical, the proximity sensor is configured to detect the proximity of the pointer by a change in an electric field according to the proximity of the pointer. In this case, the touchscreen (touch sensor) may be regarded as a proximity sensor.

The proximity sensor 241 detects proximity touch and proximity patterns (e.g., a proximity touch distance, a proximity touch direction, a proximity touch speed, a proximity touch time, a proximity touch location, a proximity touch movement state, etc.). Information corresponding to the detected proximity touch operation and proximity touch pattern may be output on the touchscreen.

The audio output module 252 may output audio data received from the wireless communication module 210 or stored in the memory 260 in a communication mode, a recording mode, a voice recognition mode, or a broadcast reception mode. The audio output module 252 may output an audio signal associated with a function (e.g., an incoming call sound, a message reception sound, etc.) performed by the mobile terminal 200. The audio output module 252 may include a receiver, a speaker, a buzzer, etc.

The alarm unit 253 outputs a signal notifying the user that an event has occurred in the mobile terminal 200. Examples of the event occurring in the mobile terminal 200 include incoming call reception, message reception, key signal input, and touch input. The alarm unit 253 outputs a signal notifying the user of the occurrence of an event in a different form from the audio or video signal, that is, in the form of vibrations. Since the video signal or the audio signal may be output through the display unit 251 or the audio output unit 252, the display unit 251 or the audio output unit 252 may be regarded as the alarm unit 253.

The haptic module 254 generates a variety of tactile effects that the user can feel. A typical example of the tactile effect generated by the haptic module 254 is vibration. The haptic module 254 may adjust the intensity and pattern of vibration generated by the haptic module 254. For example, the haptic module 254 may combine different vibrations and output the combined vibration or sequentially output different vibrations.

The memory 260 may store a program for operation of the terminal controller 280 and may temporarily store input or output data (for example, a phonebook, messages, audio, still images, and moving images). The memory 260 may store a use frequency of data (for example, use frequency of each telephone number, each message or each multimedia).

The memory 260 stores data regarding vibrations and sounds of various patterns output when a touch input of the touchscreen is detected.

The memory 260 may include a storage medium of at least one of a variety of types including a flash memory type, a hard disk type, a multimedia card micro type, a card memory type (for example, SD or XD memory), RAM, Static Random Access Memory (SRAM), Read-Only Memory (ROM), Electrically Erasable Programmable Read-Only Memory (EEPROM), Programmable Read-Only Memory (PROM), magnetic memory, magnetic disk, optical disc. The mobile terminal 200 may operate in association with a web storage that performs a storage function of the memory 260 over the Internet.

The terminal interface 270 serves as an interface with all external devices connected to the mobile terminal 200. The terminal interface 270 may receive data from an external device, receive power and transmit power to the components of the mobile terminal 200 or transmit data of the mobile terminal 200 to an external device. Examples of the terminal interface 270 include a wired/wireless headset port, an external battery charger port, a wired/wireless data port, a memory card port, a port for connecting a device including an identity module, an audio Input/Output (I/O) terminal port, a video I/O terminal port, and an earphone port.

When the wireless Internet module 213 and the short-range communication module 214 are used as wireless data ports, they may be regarded as the terminal interface 270.

The identity module is a chip for storing a variety of information for authenticating use rights of the mobile terminal 200 and includes a User Identity Module (UIM), a Subscriber Identity Module (SIM), a Universal Subscriber Identity Module (USIM), etc. The device (hereinafter, referred to as an identity device) including the identity module may be manufactured in the form of a smart card. Accordingly, the identity device may be connected to the terminal 200 through a port.

The terminal interface 270 may serve as an interface for supplying power from a cradle to the mobile terminal 200 when the mobile terminal 200 is connected to the cradle or serve as an interface for transferring various command signals input to the cradle by the user to the mobile terminal. The various command signals or power received from the cradle may function as a signal for recognizing that the mobile terminal is accurately mounted in the cradle.

The terminal controller 280 controls the overall operation of the mobile terminal 200. For example, the terminal controller 280 performs control and processing associated with voice communication, data communication, video communication, and the like. The terminal controller 280 may include a multimedia playback module 281 for multimedia reproduction. The multimedia playback module 281 may be implemented in the terminal controller 280 or may be implemented separately from the terminal controller 280.

The terminal controller 280 may perform a pattern recognition process for recognizing handwriting input and drawing input performed on the touchscreen.

Under control of the terminal controller 280, the power supply unit 290 receives external power or internal power and supplies power required for operation to each component.

The various embodiments described herein may be implemented in a recording medium readable by a computer or a similar device thereof using software, hardware or a combination thereof.

When implementing the embodiments of the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), processors, controllers, microcontrollers, microprocessors, etc.

In some instances, the embodiments described in the present specification may be implemented by the terminal controller 280.

When implementing the embodiments of the present invention by software, the procedures or functions of the embodiments described in the present specification may be implemented by separate software modules. Each software module may perform one or more functions or operations described in the present specification.

A software code may be implemented by a software application written with an adequate program language. The software code may be stored in the memory 260 or may be executed by the terminal controller 280.

Hereinafter, a process of managing content stored in the mobile terminal 200 using the image display device 100 including the above configuration will be described in detail. Hereinafter, it is assumed that the controller 114 and the signal processor 170 are separately included. However, as described above, the controller 114 and the signal processor 170 may be integrated so as to configure one component and the present invention is not limited to the configuration of the controller 114 and the signal processor 170.

The controller 114 controls the signal processor 170 and the video output unit 190 to reproduce and display the first content, that is, main content, in the first region of the screen of the image display device 100. In addition, the controller 114 controls the signal processor 170 and the video output unit 190 to display the first image representing the mobile terminal 200 connected to and communicating with the image display device 100 and the second content 24 stored in the mobile terminal 200 in the second region 20 of the screen.

In order to perform the content management method according to the embodiment of the present invention, the controller 114 searches for a mobile terminal 200 automatically or according to a user command through the interface 112. If a mobile terminal 200 connected to the image display device 100 is found, the interface 112 performs connection to the mobile terminal 200 and displays an image representing the mobile terminal 200 on a screen. In this case, it may be necessary to input a password according to setting of the mobile terminal 200. Alternatively, if a user has already been identified through the image display device 100, only the mobile terminal 200 of a user having access rights is connected so as to be displayed on the screen.

The first content includes all content which is able to be reproduced on the image display device 100, such as broadcast programs, movies or web content.

At this time, as shown in FIG. 3, the first image 22 representing the mobile terminal 200 may be the overall shape of the mobile terminal 200 including the current display screen of the mobile terminal 200. Information regarding the shape of the mobile terminal 200 may be directly received from the mobile terminal 200 through the interface 112 or identification such as a model name may be received from the mobile terminal 200 through the interface 112 and then information regarding the shape of the mobile terminal 200 may be received from a separate server based on the identification. For example, the interface 112 may receive information regarding the display screen of the mobile terminal 200 from the mobile terminal 200 as pixel information of the display screen and output the information to the controller 114.

Alternatively, the first image 22 may be a screen displayed on the mobile terminal 200 excluding the shape of the mobile terminal 200 in the second region 20. In this case, only the display screen excluding the frame shape of the mobile terminal 200 is displayed in the second region 20 of the video output unit 190.

The user input interface 150 receives the first user command for selecting the second image 24 representing the second content as an object to be reproduced on another device or to be copied to another device and outputs the first command to the controller 114. As shown in FIG. 4, for example, the first command may be input by dragging the second image 24 to the side of the first region 10. The first command may be input by another input operation such as an operation of pressing the second image 24 for a long time and the present invention is not limited in terms of the user input operation. In order to receive such a user input signal, the second image 24 may be displayed in the second region 20 in the form of a Graphical User Interface (GUI).

In order to receive a user command for the second content stored in the mobile terminal 200 using the second image 24 displayed on the video output unit 190, the interface 112 receives the coordinate information of the screen of the mobile terminal 200 from the mobile terminal 200 and associates the coordinate information of the screen of the image display device 100 with coordinate information of the screen of the mobile terminal 200. Accordingly, it is possible to determine an object desired by the user and to perform an operation corresponding thereto. Thus, a GUI menu displayed on the mobile terminal 200 may be equally displayed on the screen of the video output unit 190 and the user may input a command for the second content through the screen of the video output unit 190.

Meanwhile, the user may input the above command using a variety of input means included in the image display device 100. The above command may be input through the user input interface 150.

For example, the user selects the second image 24 through a selection key included in a general remote controller and presses a directional key indicating movement to the side of the first region 10 in a state of pressing the selection key, thereby inputting a command for dragging and dropping the second image 24 to the side of the first region 10.

The user may input the above command through a gesture performed using a motion sensing remote controller.

That is, the user may move a cursor which moves according to movement of the motion sensing remote controller to the second image 24 and press a selection key so as to select the second image 24. In addition, the user may move the second image 24 to the first region 10 in a state of pressing the selection key so as to input a drag-and-drop command.

In addition, when the image display device 100 supports a gesture recognition user interface, the above input operation may be performed by a user gesture. In addition, in the case where the video output unit 190 includes a touch pad, a user command may be input to the user input interface 150 through touch input. This is only an example of the present invention. In the present invention, the user may input a desired command through any possible input means.

The controller 114 controls the signal processor 170 and the video output unit 190 to display the third images 32 and 34 representing devices which will reproduce, store or receive the second content in a third region 30 of the screen according to the first user command. The device which will reproduce, store or receive the second content may include other image display devices 100 and the data storage device 300 connected to the image display device 100 through the external device interface 140.

For example, as shown in FIG. 5, the image 32 representing separate image display devices may be displayed in the third region 30, as devices for receiving the second content from the mobile terminal 200 and reproducing the second content. The image 34 representing a USB memory or a NAS may be displayed as devices for copying and storing the second content.

The controller 114 may control the OSD controller 181 included in the signal processor 170 to display the second region 20 and the third region 30 displayed on the screen of the video output unit 190 in the first region 10 in the form of an On Screen Display (OSD). Alternatively, as necessary, the regions may be separately displayed on the screen.

The user input interface 150 may receive the second user command for selecting a device which will reproduce, store or receive the content in the displayed third images 32 and 34. At this time, the second command may be input by dragging and dropping the second image 24 representing the second content to the side of the third images 32 and 34 representing the devices displayed in the third region 30.

At this time, the user may input a desired command to the user input interface 150 through any possible input means and the second command may be input by another input operation in addition to the drag-and-drop operation.

The controller 114 controls the interface 112 to reproduce, store or transmit the second content on, in or to the selected device according to the received second command. That is, as shown in FIG. 6, if a user selects a USB memory, the second content stored in the mobile terminal 200 is copied to and stored in the USB memory connected to the image display device 100 through the external device interface 140. As another example, if the user selects another image display device 100, the second content stored in the mobile terminal 200 is transmitted to and reproduced on another image display device 100 through the external device interface 140 or the network interface 130.

Meanwhile, as shown in FIG. 3, the controller 114 may control the display of the terminal display menu 26 for receiving the third user command for checking other mobile terminals 200 connected to and communicating with the image display device 100 in addition to the mobile terminal 200 in the second region 20 in the form of a GUI. At this time, when the user selects the displayed terminal display menu 26, the other mobile terminals 200 connected to and communicating with the image display device 100 are sequentially displayed in the second region 20 one by one through the interface 112.

If the user selects the terminal display menu 26 shown in FIG. 3, the controller 114 may control the signal processor 170 and the video output unit 190 to enlarge the second region 20 and to display the first image 22 representing the mobile terminal 200, the second image 24 representing the second content stored in the mobile terminal 200 and the fourth image 36 representing another selectable mobile terminal in the enlarged second region 28. At this time, the user may select an operation of pressing the terminal display menu 26 for a long time so as to enlarge the second region 28. As shown in FIG. 7, in the present embodiment, the fourth image 36 representing a plurality of mobile terminals 200 connected to and communicating with the image display device 100 through the interface 112 is displayed together.

The controller 114 may control the operation for copying or moving the second content stored in the mobile terminal 200 to another mobile terminal 200. That is, if the user input interface 150 receives the fourth user command for selecting the second image 24 representing the second content displayed in the enlarged second region 28 and the fourth image 36 representing another mobile terminal 200 and outputs the fourth command to the controller 114, the controller 114 may control the network interface 130 to transmit the second content to the second mobile terminal 200 according to the received fourth command.

For example, the fourth command may be input by dragging and dropping the second image 24 to the side of the fourth image 36 representing a mobile terminal 200 different from the mobile terminal 200 in which the second content is stored. The user may input a desired command through any possible input means and the fourth command may be input by another input operation in addition to the drag-and-drop operation.

The image display device 100 may share the second content stored in the mobile terminal 200 with another user. As shown in FIG. 8, the user may input the fifth command for sharing the second content by dragging the second image 24 to the outside of the screen. In this case, as shown in FIG. 9, the controller 114 controls the signal processor 170 and the video output unit 190 to display the sharing method selection menu 38 for sharing the second content through the email server 500, the SNS server 400 or the mobile terminal 600 according to user input in the form of a GUI. At this time, the user may input a desired command through any possible input means and the fifth user command may be input by another input operation in addition to the drag operation.

If the user selects a sharing method through the sharing method selection menu 38, the controller 114 may transmit the second content to the SNS server 400, the email server 500 or the mobile terminal 600 through the interface 112.

The controller 114 may control the reproduction or storage of the second content in the image display device 100 according to user input. The user may input the sixth command by an operation for dragging and dropping the second image 24 to the first region 10. At this time, the controller 114 may control the display of the reproduction/copy selection menu 40 for receiving the user command for reproducing or storing the second content on the screen of the video output unit 190 according to the user input. The sixth user command may be input by another input operation in addition to the drag operation.

If the user selects that the content is reproduced on or copied to the image display device 100 through the displayed reproduction/copy selection menu 40, the controller 114 controls the signal processor 170 and the video output unit 190 or the memory 160 to perform the selected function.

According to embodiments of the present invention, it is possible to increase user convenience when content stored in a mobile terminal is to be reproduced on or copied to another device.

In addition, it is possible to increase user convenience when content stored in a mobile terminal is to be transmitted to another mobile terminal connected to an image display device.

In addition, it is possible to increase user convenience when content stored in a mobile terminal is to be transmitted to an external server or a wireless terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing content using an image display device, the method comprising:

reproducing and displaying first content in a first region of a screen of the image display device;

displaying a first image representing a first mobile terminal connected to and communicating with the image display device and a second image representing second content stored in the first mobile terminal in a second region of the screen of the image display device;

receiving a first user command for selecting the second image;

displaying a third image representing a device which will reproduce, store or receive the second content of the first mobile terminal in a third region of the screen of the image display device;

receiving a second user command for selecting the device which will reproduce, store or receive the second content;

enabling the selected device to reproduce, store or receive the second content according to the second user command;

receiving a third user command for displaying a second mobile terminal connected to the image display device in addition to the first mobile terminal in the second region;

in response to the third user command, enlarging the second region and causing the first region to disappear, such that a fourth image representing the second mobile terminal is newly displayed together with the first image representing the first mobile terminal within the enlarged second region, the third image representing the device being displayed in the third region, and the first content being no longer displayed;

receiving a user input signal of dragging the second image to an outside of the screen; and newly displaying a menu for sharing the second content through an email server or a Social Network Service (SNS) server.

2. The method according to claim 1, wherein a terminal display menu is displayed within the second region to receive the third user command.

3. The method according to claim 1, further comprising:

receiving a fourth user command for selecting the second image and the fourth image displayed in the enlarged second region; and transmitting the second content to the second mobile terminal according to the fourth command.

4. The method according to claim 1, wherein the first image represents a screen displayed on the first mobile terminal.

5. The method according to claim 1, wherein the first image represents the overall shape of the first mobile terminal.

6. The method according to claim 1, wherein the device which will reproduce, store or receive the second content includes a second image display device and a data storage device connected to the image display device.

7. The method according to claim 1, wherein the second region and the third region are displayed in the first region in the form of an On Screen Display (OSD).

8. The method according to claim 1, wherein the first user command is input by dragging the second image to a side of the first region.

9. The method according to claim 1, wherein the second user command is input by dragging and dropping the second image to a side of the third image representing the device displayed in the third region.

10. The method according to claim 1, further comprising:

receiving a user input signal for dragging and dropping the second image to the first region; and displaying a reproduction/storage selection menu for receiving a user command for reproducing or storing the second content on or in the image display device according to the user input signal.

11. An image display device, comprising:

a video output unit configured to display an image;

an interface configured to transmit or receive data to or from a first mobile terminal connected to and communicating with the image display device and receive a user command; and a controller configured to control the video output unit according to the user command received through the interface, to control the video output unit to reproduce and display first content in a first region of a screen of the video output unit and to display a first image representing the first mobile terminal and a second image representing second content stored in the first mobile terminal in a second region of the screen of the image display device, wherein the controller is further configured to receive, via the interface, a first user command for selecting the second image and to control the video output unit to display a third image representing a device which will reproduce, store or receive the second content of the first mobile terminal in a third region of the screen of the image display device according to the first user command, wherein the controller is further configured to receive, via the interface, a second user command for selecting the device which will reproduce, store or receive the second content and to control the selected device to reproduce, store or receive the second content according to the second user command, wherein the controller is further configured to:

receive, via the interface, a third user command for displaying a second mobile terminal connected to the image display device in addition to the first mobile terminal in the second region;

in response to the third user command, enlarge the second region and cause the first region to disappear, such that a fourth image representing the second mobile terminal is newly displayed together with the first image representing the first mobile terminal within the enlarged second region, the third image representing the device being displayed in the third region, and the first content being no longer displayed; and receive, via the interface, a user input signal of dragging the second image to an outside of the screen and control the video output unit to newly display a menu for sharing the second content through an email server or a Social Network Service (SNS) server according to the user input signal.

12. The image display device according to claim 11, wherein a terminal display menu is displayed within the second region to receive the third user command.

13. The image display device according to claim 11, wherein:

the controller is further configured to receive, via the interface, a fourth user command for selecting the second image and the fourth image displayed in the enlarged second region and to transmit the second content to the second mobile terminal according to the fourth command.

14. The image display device according to claim 11, wherein the controller is further configured to control the interface to transmit the second content to a second image display device or a data storage device connected to the image display device.

15. The image display device according to claim 11, wherein the controller further includes an On Screen Display (OSD) generator configured to control the video output unit to display the second region and the third region in the first region in the form of the OSD.

16. The image display device according to claim 11, wherein the controller is further configured to receive, via the interface, the first user command by dragging the second image to a side of the first region.

17. The image display device according to claim 11, wherein the controller is further configured to receive, via the interface, the second command by dragging and dropping the second image to a side of the third image representing the device displayed in the third region.

18. The image display device according to claim 11, wherein:

the controller is further configured to receive, via the interface, a user input signal for dragging and dropping the second image to the first region and to control the video output unit to display a reproduction/storage selection menu for receiving a user command for reproducing or storing the second content on or in the image display device according to the user input signal.

* * * * *